(12) United States Patent
Yong et al.

(10) Patent No.: US 12,108,447 B2
(45) Date of Patent: Oct. 1, 2024

(54) REQUEST TO SEND (RTS)/CLEAR TO SEND (CTS) FRAMES AND TRANSMISSION RULES

(71) Applicant: Apple Inc., Cupertino, CA (US)

(72) Inventors: Su Khiong Yong, Palo Alto, CA (US); Jinjing Jiang, San Jose, CA (US); Yong Liu, Cupertino, CA (US); Jarkko L. Kneckt, Los Gatos, CA (US); Tianyu Wu, Cupertino, CA (US); Qi Wang, Sunnyvale, CA (US); Lochan Verma, San Diego, CA (US)

(73) Assignee: Apple Inc., Cupertino, CA (US)

( * ) Notice: Subject to any disclaimer, the term of this patent is extended or adjusted under 35 U.S.C. 154(b) by 738 days.

(21) Appl. No.: 17/187,198

(22) Filed: Feb. 26, 2021

(65) Prior Publication Data

US 2021/0337595 A1 Oct. 28, 2021

Related U.S. Application Data

(60) Provisional application No. 63/016,066, filed on Apr. 27, 2020.

(51) Int. Cl.
*H04W 74/08* (2024.01)
*H04W 72/04* (2023.01)
(Continued)

(52) U.S. Cl.
CPC ... *H04W 74/0816* (2013.01); *H04W 72/0446* (2013.01)

(58) Field of Classification Search
CPC .............. H04W 74/0816; H04W 72/0446
See application file for complete search history.

(56) References Cited

U.S. PATENT DOCUMENTS 10,687,281 B2 6/2020 Son et al.
2014/0328235 A1* 11/2014 Merlin ............... H04B 7/26
370/312
(Continued)

FOREIGN PATENT DOCUMENTS

CN 108702375 A 10/2018
CN 110621043 A 12/2019
(Continued)

OTHER PUBLICATIONS

Seok et al., "EHT RTS and CTS Procedure, doc.: IEEE 802.11-19/2125r0" (11-19-2125-00-00be-EHT-RTS-and-CTS-procedure), Jan. 10, 2020, 16 pages.
(Continued)

*Primary Examiner* — Melvin C Marcelo
(74) *Attorney, Agent, or Firm* — Sterne, Kessler, Goldstein & Fox P.L.L.C.

(57) ABSTRACT

Some aspects of this disclosure include apparatuses and methods for implementing request to send (RTS) and clear to transmit (CTS) frames and transmission rules for the RTS and CTS frame. For example, some aspects relate to an electronic device including a transceiver and one or more processors communicatively coupled to the transceiver. The one or more processors receive, using the transceiver, a request to send (RTS) frame from the second electronic device and determine, using the received RTS frame, a format for a clear to send (CTS) frame to use in response to the RTS frame. The one or more processors further transmit, using the transceiver, the CTS frame based on the determined format on at least one sub-channel on which the RTS frame was received and that the at least one sub-channel is idle.

20 Claims, 10 Drawing Sheets

(51) Int. Cl.
*H04W 72/0446* (2023.01)
*H04W 74/0816* (2024.01)

(56) References Cited

U.S. PATENT DOCUMENTS

| | | | |
|---|---|---|---|
| 2017/0055290 A1* | 2/2017 | Lv | .................. H04W 74/0816 |
| 2017/0290060 A1 | 10/2017 | Kim et al. | |
| 2018/0092127 A1 | 3/2018 | Park | |
| 2018/0302858 A1 | 10/2018 | Son et al. | |
| 2019/0349930 A1 | 11/2019 | Chu et al. | |
| 2020/0037342 A1 | 1/2020 | Seok et al. | |
| 2021/0028897 A1 | 1/2021 | Park et al. | |
| 2021/0105667 A1 | 4/2021 | Li et al. | |
| 2023/0039547 A1* | 2/2023 | Yang | ..................... H04L 1/00 |

FOREIGN PATENT DOCUMENTS

| | | |
|---|---|---|
| TW | 202015386 A | 4/2020 |
| WO | WO 2017193028 A2 | 11/2017 |
| WO | WO 2019194516 A1 | 10/2019 |

OTHER PUBLICATIONS

Edward Au, "Specification Framework for TGbe, doc.: IEEE 802.11-19/1262r8" (11-19-1262-08-00be-specification-framework-for-tgbe), Feb. 11, 2020, 20 pages.

Sok-Ian Sou et al., "Trigger-based Approach with Hidden Node Problem for Uplink Multi-User Transmission in 802.11ax," Jul. 6, 2017; 5 pages.

\* cited by examiner

REQUEST TO SEND (RTS)/CLEAR TO SEND (CTS) FRAMES AND TRANSMISSION RULES

CROSS-REFERENCE TO RELATED APPLICATIONS

The present application claims the benefit of U.S. Provisional Patent Application No. 63/016,066, filed on Apr. 27, 2020, which is hereby incorporated by reference in its entirety.

BACKGROUND

Field

The described aspects generally relate to channel access in wireless communications. For example, the aspects of this disclosure relate to request to send (RTS) frames, clear to send (CTS) frames, and transmission rules for RTS and/or CTS frames.

Related Art

Request to send (RTS) and clear to send (CTS) are mechanisms that can be used in communication systems (for example, wireless communication systems) to reduce data collision by, for example, reserving a channel. For example, a first station (STA) having data to transmit (e.g., a transmitting STA) sends an RTS frame to a second STA (e.g., a receiving STA) on a channel. After a time period (e.g., a short interframe space (SIFS)), the receiving STA sends a CTS frame to the transmitting STA to indicate that the channel is free and the transmitting STA can send its data. After receiving the CTS frame and, for example, after a time period (e.g., SIFS), the transmitting STA sends its data on the channel to the receiving STA. If the receiving STA receives and decodes the data correctly, the receiving STA can send an acknowledgment (ACK), for example, after a time period (e.g., SIFS) after receiving the data.

SUMMARY

Some aspects of this disclosure include apparatuses and methods for implementing request to send (RTS) and clear to transmit (CTS) frames and transmission rules for the RTS and CTS frame. For example, some aspects of this disclosure are directed to punctured RTS transmission rules. Some aspects are directed to punctured CTS transmission rules. Some aspects of this disclosure are directed to the RTS frames and the CTS frames. Additionally, some aspects of this disclosure are directed to clear channel assessment (CCA) rules for the RTS and CTS. According to some aspects, the RTS/CTS frames and transmission rules are discussed with respect to large-size resource unit (RU) (e.g., more than or equal to 242 tones and/or more than or equal to 20 MHz bandwidth) aggregation modes in an orthogonal frequency-division multiple access (OFDMA) and/or in a non-OFDMA transmission.

Some aspects relate to an electronic device. The electronic device includes a transceiver configured to communicate with a second electronic device and one or more processors communicatively coupled to the transceiver. The one or more processors receive, using the transceiver, a request to send (RTS) frame from the second electronic device and determine, using the received RTS frame, a format for a clear to send (CTS) frame to use in response to the RTS frame. The one or more processors further transmit, using the transceiver, the CTS frame based on the determined format on at least one sub-channel on which the RTS frame was received and in response to the at least one sub-channel being idle.

Some aspects relate to a method including receiving, at a first electronic device and on at least one sub-channel, a request to send (RTS) frame from a second electronic device. The method further includes determining, using the received RTS frame, a format for a clear to send (CTS) frame to use in response to the RTS frame. The method also includes determining that the at least one sub-channel is idle and transmitting, to the second electronic device, the CTS frame based on the determined format on at the least one sub-channel on which the RTS frame was received and in response to the at least one sub-channel being idle.

Some aspects relate to a non-transitory computer-readable medium storing instructions. When the instructions are executed by a processor of an electronic device, the instructions cause the processor to perform operations including receiving, at the electronic device and on at least one sub-channel, a request to send (RTS) frame from a second electronic device. The operations further include determining, using the received RTS frame, a format for a clear to send (CTS) frame to use in response to the RTS frame. The operations also include determining that the at least one sub-channel is idle and transmitting, to the second electronic device, the CTS frame based on the determined format on at the least one sub-channel on which the RTS frame was received and in response to the at least one sub-channel being idle.

Some aspects relate to an electronic device. The electronic device includes a transceiver configured to communicate with a second electronic device and one or more processors communicatively coupled to the transceiver. The one or more processors generate a request to send (RTS) frame, where the RTS frame comprises a first subfield and a second subfield for indicating a bandwidth (BW) associated with the RTS frame. The one or more processors further determine that at least one sub-channel is idle and transmit, using the transceiver and to the second electronic device, the RTS frame on the at least one sub-channel.

Some aspects relate to a method including generating a request to send (RTS) frame, where the RTS frame comprises a first subfield and a second subfield for indicating a bandwidth (BW) associated with the RTS frame. The method further includes determining that at least one sub-channel is idle and transmitting, to a second electronic device, the RTS frame on the at least one sub-channel.

Some aspects relate to a non-transitory computer-readable medium storing instructions. When the instructions are executed by a processor of an electronic device, the instructions cause the processor to perform operations including generating a request to send (RTS) frame, where the RTS frame comprises a first subfield and a second subfield for indicating a bandwidth (BW) associated with the RTS frame. The operations further include determining that at least one sub-channel is idle and transmitting, to a second electronic device, the RTS frame on the at least one sub-channel.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
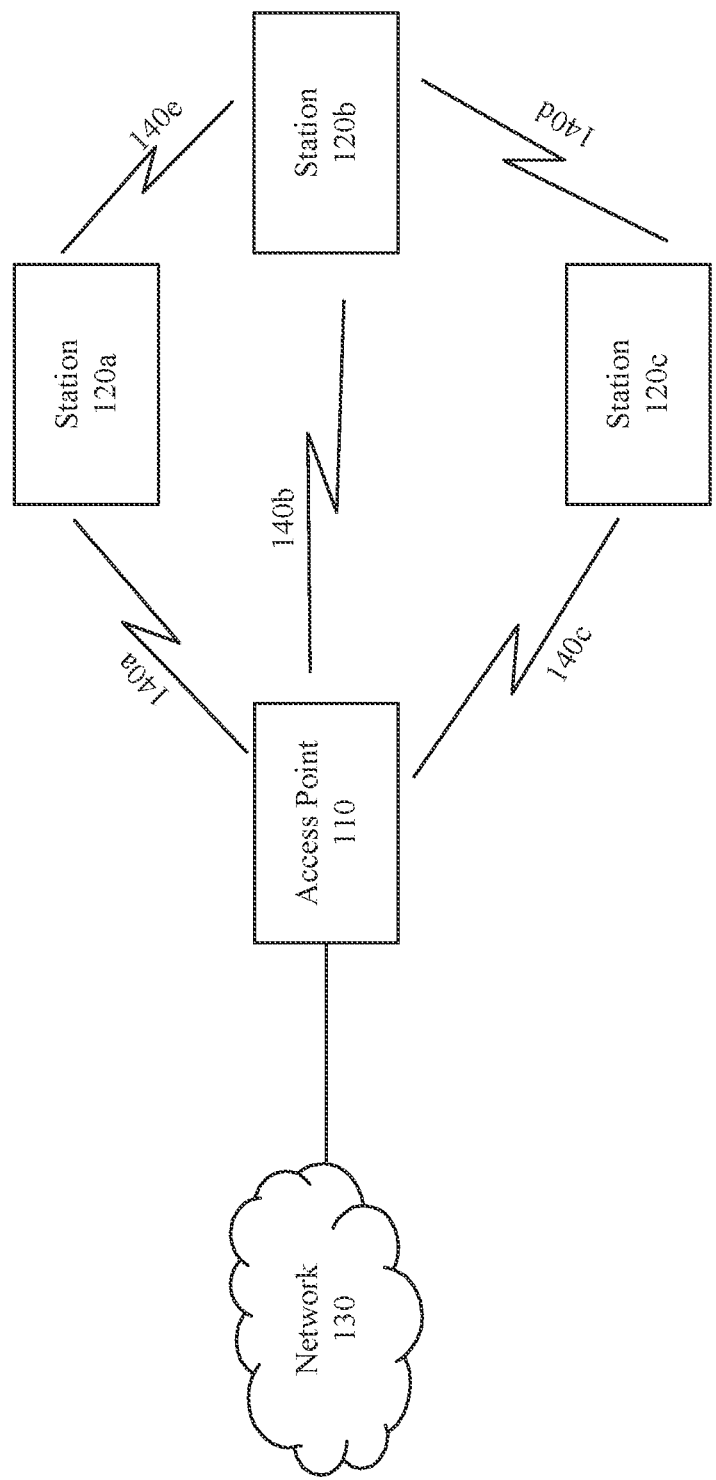
FIG. 1 illustrates an example system implementing RTS/CTS frames and transmission rules, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing request to send (RTS) and clear to transmit (CTS) frames and transmission rules for the RTS and CTS frame. For example, some aspects of this disclosure are directed to punctured RTS transmission rules. Some aspects are directed to punctured CTS transmission rules. Some aspects of this disclosure are directed to the RTS frames and the CTS frames. Additionally, some aspects of this disclosure are directed to clear channel assessment (CCA) rules for the RTS and CTS.

According to some aspects, the RTS/CTS frames and transmission rules of this disclosure can be implemented with communication techniques compatible with Institute of Electrical and Electronics Engineers (IEEE) 802.11 standards (such as, but not limited to IEEE 802.11ac, IEEE 802.11ax, IEEE 802.11bc, IEEE 802.11bd, IEEE 802.11be, etc.). For example, the RTS/CTS frames and transmission rules can be used within a wireless local area network (WLAN).

According to some aspects, the RTS/CTS frames and transmission rules can be used with IEEE 802.11be and also can be compatible with IEEE 802.11ax. However, the aspects of this disclosure are not limited to these examples.

According to some aspects, the large-size resource unit (RU) aggregation rules and/or modes used for transmissions in a wireless network (for example, a WLAN) can have implications on RTS/CTS frames and transmission rules. Additionally, using larger bandwidths for transmitting data (for example, frames such as, but not limited to, physical layer convergence protocol data unit (PPDU)) can also have implications on RTS/CTS frames and transmission rules. According to some aspects of this disclosure, RTS/CTS frames and transmission rules are provided for large-size aggregation rules/modes and/or for PPDU bandwidths (BW) including, but not limited to, 320 MHz, 160+160 MHz, 240 MHz, and/or 160+80 MHz. However, the aspects of this disclosure are not limited to these examples, and can be applied to other aggregation rules/mode and/or other PPDU BWs.

As discussed in more detail below, according to some aspects, only a high efficiency (HE) multi-user (MU) RTS (HE MU-RTS) Trigger frame can be used to elicit CTS response from one or more stations (STAs). According to some aspects, and as discussed in more detail below, using the HE MU-RTS Trigger frame can preserve the property that HE devices can reset network allocation vector (NAV) set by MU-RTS. When the MU-RTS elicits CTS response from more than one STA, then CTS can use legacy CTS format for the CTS response, according to some aspects. However, if the MU-RTS elicits CTS response from one STA, then CTS can use an ehtCTS format (as discussed in more detail below) for the CTS response, according to some aspects. Additionally, some aspects of this disclosure are directed to clear channel assessment (CCA) rules for MU-RTS/CTS and MU-RTS/ehtCTS.

According to some aspects, the RTS/CTS frames and transmission rules are discussed with respect to large-size RU (e.g., more than or equal to 20 MHz bandwidth and/or more than or equal to 242 tones) aggregation modes in an orthogonal frequency-division multiple access (OFDMA) and/or in a non-OFDMA transmission. This disclosure provide examples for punctured RTS transmission rules. In some examples, the RTS frame is transmitted only on one or more sub-channels that have CCA idle and that yield a valid large-size RU aggregation mode. According to some examples, this exemplary method can avoid unnecessary medium reservation. Additionally, or alternatively, the RTS frame can be transmitted on all the sub-channels that have CCA idle.

This disclosure also provides examples for punctured CTS transmission rules. In some examples, the CTS frame can be transmitted on all sub-channels on which the RTS frame was received and that have CCA idle. According to some examples, this exemplary method can results in simplicity of CTS transmission logic. Additionally, or alternatively, the CTS frame can be transmitted only on sub-channels on which the RTS frame was received, that have CCA idle, and that yield a large-size RU aggregation mode.

In addition to the exemplary RTS/CTS transmission rules, this disclosure provides exemplary RTS frame(s) and CTS frame(s). According to some examples, BW signaling target address (TA) method used in IEEE 802.11 standards (such as but not limited to IEEE 802.11ac) can be extended as exemplary RTS frame(s) and CTS frame(s). However, in some examples, extending BW signaling TA method can have feasibility issue(s) due to lack of bits available for repurposing. According to some aspects, new RTS frame(s) and CTS frame(s) can be defined. However, defining new RTS frames may result in HE devices not being able to reset NAV using the new RTS frame(s). In other words, the new RTS frame(s) may not be backward compatible and cannot be used by STAs operating based on, for example, IEEE 802.11ax.

According to some aspects, HE MU-RTS Trigger frame can be adapted and used for exemplary RTS frame(s). In these examples, HE STAs will be able to reset NAV using the MU-RTS frame. For example, a STA can use the MU-RTS frame followed by no CTS frame and no data to clear NAV. In other words, the MU-RTS frame can be backward compatible and can be used by STAs operating based on, for example, IEEE 802.11ax. Additionally, the MU-RTS frames can be used by extremely high throughput (EHT) STAs too. For example, by STAs operating based on IEEE 802.11be.

As discussed in more detail below, the MU-RTS frame can carry a special user info field to be used to indicate a value of the bandwidth (BW) associated with the MU-RTS frame (and/or BW associated with the PPDU carrying the MU-RTS frame—for example, but not limited to, 320 MHz, 160+160 MHz, 240 MHz, 160+80 MHz). In some examples, a subfield in the special user info field in addition to a subfield in a common info field of the MU-RTS frame can be used to indicate the value of the BW. Additionally, or alternatively, the special user info field of the MU-RTS frame can include a puncture pattern. The puncture pattern can include a bitmap mapping to each of the sub-channels in the PPDU BW. Also, the special user info field of the MU-RTS frame can further include an association identifier (AID) value to identify that this user info field is a special user info field.

The MU-RTS frame can further include one or more user info fields. Each user info field can include its associated AID value. According to some aspects, the MU-RTS frame can be transmitted by an access point (AP) and/or a non-AP STA. In some examples, for the MU-RTS frame transmitted by an AP, an AID value of a user info field can be set to the AID value of the non-AP STA that is being triggered for the CTS response. Additionally, or alternatively, for the MU-RTS frame transmitted by a non-AP STA, the AID value of the user info field can be set to the AID value of the non-AP STA that is transmitting the MU-RTS frame. Additionally, or alternatively, the AID value can be set to value "0" (e.g., reserved) or some other pre-defined value.

According to some examples, the MU-RTS frame can be carried in a non-HT (high throughput) PPDU or a non-HT DUP (duplicate) PPDU.

In addition to the exemplary RTS/CTS transmission rules and the RTS frame(s), this disclosure provides exemplary CTS frame(s). According to some aspects, a receiving STA that receives the RTS frame (for example, the MU-RTS frame) from a transmitting STA uses a legacy CTS frame format (for example as used in IEEE 802.11 standards such as, but not limited to IEEE 802.11ax) when the RTS frame indicates that this RTS is eliciting response(s) from more than one STA. In this example, the CTS frame does not indicate reserved BW because the CTS frames transmitted by the STAs are to be identical.

According to some aspects, the receiving STA that receives the RTS frame (for example, the MU-RTS frame) from the transmitting STA uses a new ehtCTS frame format when the RTS frame indicates that this RTS is eliciting response from one STA. In this example, ehtCTS frame can indicate the reserved BW allowing any STA to determine the reserved BW by receiving the ehtCTS frame on, for example, at least a primary channel (for example, a primary 20 MHz channel). According to some aspects, the CTS frame and/or the ehtCTS frame can be carried in a non-HT PPDU or a non-HT DUP PPDU. According to some examples, one bit in the common info field of the RTS frame (for example, the MU-RTS frame) can indicate to the receiving STA, which CTS frame to use in response to the RTS frame.

In addition to the exemplary RTS/CTS transmission rules and the RTS/CTS frame(s), this disclosure provides exemplary clear channel assessment (CCA) rules for the CTS and ehtCTS frames. According to some aspects, clear channel assessment (CCA) is a mechanism for a STA to determine whether the channel is idle or not. According to some examples, CCA can include one or more mechanisms. For example, CCA can include carrier sensing (CS). Additionally, or alternatively, CCA can include energy detection (ED). In energy detection mechanisms, the STA can measure the energy that the STA receives. If the measured energy is greater than a threshold, the STA can determine that the channel is busy. If the measured energy is less than the threshold, the STA can determine that the channel is idle. According to some aspect, the threshold can be defined in the IEEE 802.11 standards.

In some examples, CS can include a physical CS, which can be performed by physical (PHY) layer. Additionally, or alternatively, CCA can include virtual CS, which can be provided by medium access control (MAC) layer. Virtual CS can also be referred to as network allocation vector (NAV). According to some aspects, NAV is (or includes) an indicator for the STA indicating when the channel will become idle the next time. NAV can be kept current using, for example, session duration values in frames. For example, when the STA receives a valid frame that is not addressed to the STA, the STA can use the duration value in the frame to update the STA's NAV. In some examples, the STA updates its NAV when the duration value of the frame is greater than the current value of the STA's NAV. In some examples, by using the NAV, the STA can avoid transmitting on the channel even if the physical CS indicates that the channel is idle.

According to some aspects, HE CCA rules for CTS frame used in, for example, IEEE 802.11ax and/or IEEE 802.11be can be carried over to MU-RTS frame. For example, a combination of virtual CS and ED-based CCA during SIFS after MU-RTS frame can be used to determine medium state (for example, channel state) on non-puncture sub-channels (for example, non-puncture 20 MHz sub-channels). In some examples, only non-primary channels are punctures.

According to some aspects, if MU-RTS frame is eliciting response from more than one STA, the STA may transmit the CTS response only when all the sub-channels (for example, all the 20 MHz sub-channels) contained in the allocated RU are CCA idle. Additionally, or alternatively, if MU-RTS frame is eliciting response from one STA, the STA may transmit the ehtCTS response on the primary sub-channel (for example, the primary 20 MHz sub-channel) and any other sub-channels (for example, any other 20 MHz sub-channels) contained in the allocated RU that are CCA idle.

FIG. 1 illustrates an example system 100 implementing RTS/CTS frames and transmission rules, according to some aspects of the disclosure. Example system 100 is provided for the purpose of illustration only and does not limit the disclosed aspects. System 100 may include, but is not limited to, access point (AP) 110, stations (STA) 120, and network 130. Stations 120a-120c may include, but are not limited to, Wireless Local Area Network (WLAN) stations such as wireless communication devices, smart phones, laptops, desktops, tablets, personal assistants, monitors, televisions, wearable devices (e.g., smart watches), and the like. Access point (AP) 110 may include but is not limited to WLAN electronic devices such as a wireless router, a wearable device (e.g., a smart watch), a wireless communication device (e.g., a smart phone), or a combination thereof. Network 130 may be the Internet and/or a WLAN. Station 120's communications are shown as wireless communications 140. The communication between AP 110 and STA 120 can take place using wireless communications 140a-140c. The communication between STAs 120 can take place using wireless communications 140d-140e. The wireless communications 140a-140e can be based on a wide variety of wireless communication techniques. These techniques can include, but are not limited to, techniques based on IEEE 802.11 (such as, but not limited to, IEEE 802.11ac, IEEE 802.11ax, IEEE 802.11bc, IEEE 802.11bd, IEEE 802.11be, IEEE 802.11v, etc.)

It is noted that although some aspects are discussed with respect to some examples of WLAN, the aspects of this disclosure are not limited to these examples of WLAN and can be used by other WLAN topologies such as, but not limited to, infrastructure network, peer-to-peer network, mesh network, and the like. Also, some aspects of this disclosure are discussed with respect to the communication between non-AP STAs (for example, STAs 120) and/or the communication between an AP (for example, AP 110) and a non-AP STA (for example, STA 120). However, the aspects of this disclosure can be applied to the communications between any STAs (AP and/or non-AP STAs).

According to some aspects, AP 110 and/or STAs 120 are configured to implement the RTS/CTS frames and transmission rules. For example, AP 110 and STA 120a can use the RTS/CTS frames and transmission rules of this disclosure to reduce data collision by, for example, reserving a channel. For example, a first STA having data to transmit (for example, a transmitting STA such as AP 110) sends an RTS frame to a second STA (for example, a receiving STA such as STA 120a) on a channel. After a time period (e.g., a short interframe space (SIFS)), STA 120a sends a CTS frame to AP 110 to indicate that the channel is free and AP 110 can send its data. After receiving the CTS frame and, for example, after a time period (e.g., SIFS), AP 110 sends its data on the channel to STA 120. If STA 120a receives and decodes the data correctly, STA 120a can send an acknowledgment (ACK), for example, after a time period (e.g., SIFS) after receiving the data.

According to some aspects, AP 110 is configured to transmit its frames (for example, data, RTS frame, CTS frame, etc.) using a large-size resource unit (RU) aggregation mode. In some examples, the large-size RU aggregation mode can include a mode where 242 or more subcarriers/tones are aggregated in the frame. Additionally, or alternatively, the large-size RU aggregation mode can include a mode where RU's bandwidth is 20 MHz or more. However, the large-size RU aggregation mode can include mode(s) where other number of subcarriers/tones and/or bandwidths are aggregated. According to some examples, the large-size RU aggregation mode is used as defined in, for example, IEEE 802.11ax and/or IEEE 802.11be. According to some examples, the large-size RU aggregation mode can be used for OFDMA transmission and/or for non-OFDMA transmission.

According to some aspects, when a frame with large bandwidth (BW) and/or in the large-size RU aggregation mode is used, the BW can be divided into a plurality of sub-channels. According to some examples, one or more of the sub-channels in the BW can be used for incumbent devices' transmissions. In other words, when AP 110 transmits the frame with large BW and/or in the large-size RU aggregation mode, AP 110 does not transmit any data, information, and/or request in one or more sub-channels of the BW (for example, AP 110 uses bits with values of "0" for the subcarriers in the one or more sub-channels (subcarriers are zeroed out)). These one or more sub-channels can be used by other devices (for example, incumbent devices such as satellites, radars, etc. that used to use those channels/bandwidths) to transmit data/information that use the frequencies in those one or more sub-channels. In other words, these one or more sub-channels are considered puncture sub-channels. Some aspects of this disclosure discuss a single puncture sub-channel. However, the aspects of this disclosure are not limited to these examples, and other number of puncture sub-channels can be used.

In a non-limiting example, a frame with 80 MHz BW (a frame for OFDMA transmission and/or non-OFDMA transmission) can include (and/or allow to include) a single puncture of 20 MHz sub-channel. In this non-limiting example, the 80 MHz BW can include two 20 MHz sub-channels, a 20 MHz puncture sub-channel, and another 20 MHz sub-channel. Alternatively, the 80 MHz BW can include one 20 MHz channel, the 20 MHz puncture sub-channel, and two 20 MHz sub-channels. When a frame with large bandwidth (BW) and/or in the large-size RU aggregation mode is used, the transmitting STA (for example, AP 110) can have different options for transmitting the RTS frame. Two exemplary punctured RTS transmission rules are discussed in FIGS. 2A and 2B.

Figure 2A:
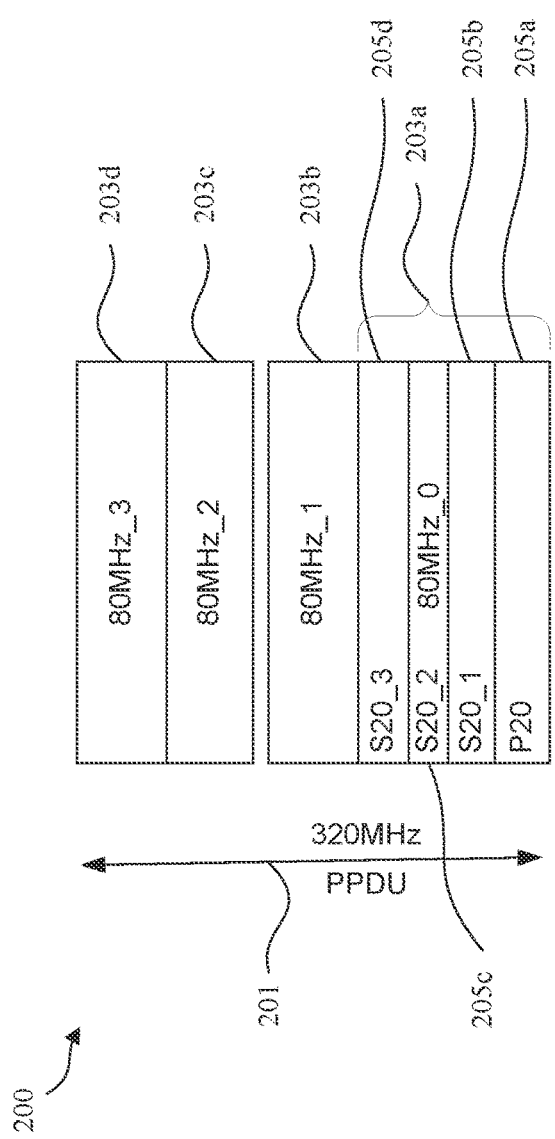
FIGS. 2A and 2B illustrate exemplary punctured RTS transmission rules, according to some aspects of the disclosure.

FIG. 2A illustrates an exemplary punctured RTS transmission rule 200, according to some aspects of the disclosure. As one non-limiting example, the frame BW 201 (for example, the PPDU BW) is 320 MHz and includes four segments 203a-203d (collectively referred to as segments 203). Each of segments 203 can have a BW of 80 MHz. According to some examples, segment 203a can be divided into four sub-channels 205a-205d each having a BW of 20 MHz. In some examples, sub-channel 205a can be the primary sub-channel and sub-channel 205c can be the puncture sub-channel. The exemplary punctured RTS transmission rule 200 is discussed with respect to channel 203a. However, similar punctured RTS transmission rule can be applied to other channels 203b-203d.

According to some aspects, in punctured RTS transmission rule 200, the RTS frame is transmitted only on the sub-channels that have CCA idle and that yield large-size RU aggregation mode, as discussed above. In other words, for AP 110 to transmit its RTS frame, AP 110 can use one or more CCA mechanisms to determine the sub-channel(s) that are idle and AP 110 can determine the sub-channel(s) that that yield large-size RU aggregation mode. For example, assuming that sub-channels 205a, 205b, and 205d are CCA idle, AP 110 transmits only on sub-channels 205a and 205b that yield large-size RU aggregation mode, according to some aspects. In this example, sub-channels 205a and 205b are aggregated to yield large-size RU aggregation mode. According to some examples, punctured RTS transmission rule 200 of FIG. 2A can avoid unnecessary medium reservation.

According to some aspects, if one or more segments (e.g., segment 203b) does not include any puncture sub-channel and all sub-channels of segment 203b are CAA idle, AP 110 can transmit the RTS frame on each sub-channel of segment 203b.

Figure 2B:
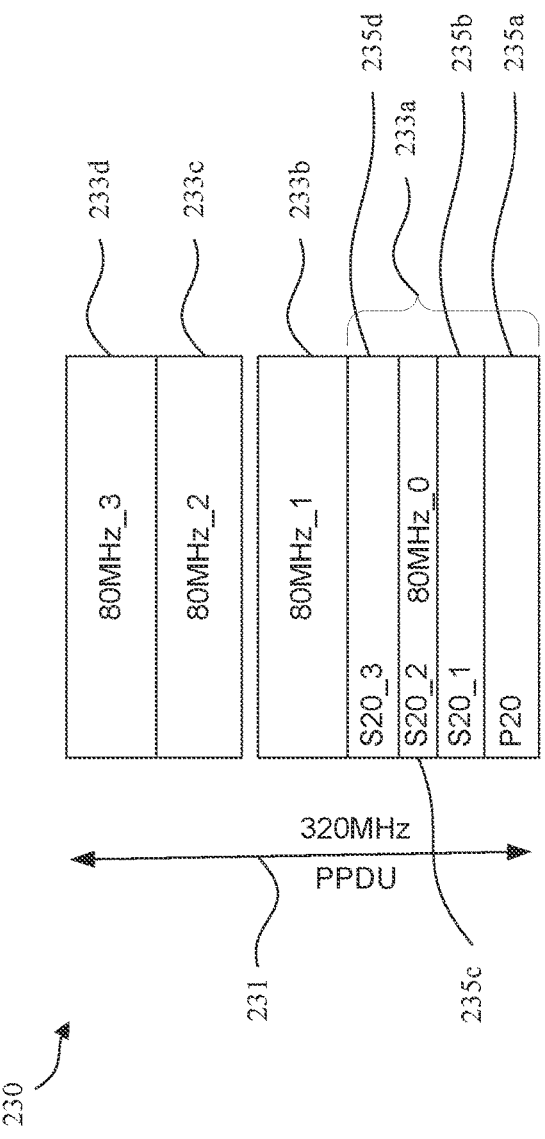

FIG. 2B illustrates another exemplary punctured RTS transmission rule 230, according to some aspects of the disclosure. As one non-limiting example, the frame BW 231 (for example, the PPDU BW) is 320 MHz and includes four segments 233a-233d (collectively referred to as segments 233). Each of segments 233 can have a BW of 80 MHz. According to some examples, segment 233a can be divided into four sub-channels 235a-235d each having a BW of 20 MHz. In some examples, sub-channel 235a can be the primary sub-channel and sub-channel 235c can be the puncture sub-channel. The exemplary punctured RTS transmission rule 230 is discussed with respect to channel 233a. However, similar punctured RTS transmission rule can be applied to other channels 233b-233d.

According to some aspects, in punctured RTS transmission rule 230, the RTS frame is transmitted on all the sub-channels that have CCA idle. In other words, for AP 110 to transmit its RTS frame, AP 110 can use one or more CCA mechanisms to determine the sub-channel(s) that are idle. For example, assuming that sub-channels 235a, 235b, and 235d are CCA idle, AP 110 transmits on sub-channels 235a, 235b, and 205d, according to some aspects. According to some examples, punctured RTS transmission rule 230 of FIG. 2B can be simple to implement and can accommodate for cases where the CTS frame is returned, for example, on 80/160 MHz BW, where 20 MHz puncturing is allowed.

According to some aspects, if one or more segments (for example, segment 233b) does not include any puncture sub-channel and all sub-channels of segment 233b are CAA idle, AP 110 can transmit the RTS frame on each sub-channel of segment 233b.

Although punctured RTS transmission rules 200 and 230 are discussed with respect to a frame BW of 320 MHz, four channels of 80 MHz, and sub-channels of 20 MHz, the aspects of this disclosure are not limited to these examples, and other values for the frame BW, large-size RU aggregation mode, channels, and/or sub-channels can be used.

According to some aspects, after receiving the RTS frame from AP 110, STA 120a can send a CTS frame back to AP 110 if the channel is clear for AP 110 to transmit its data. In some examples, STA 120 can send the CTS frame after a time period (e.g., SIFS) after receiving the RTS frame to AP 110 to indicate that the channel is free and AP 110 can send its data. According to some aspects, STA 120a is configured to transmit its frames (for example, data, RTS frame, CTS frame, etc.) using the large-size RU aggregation mode. When a frame with large bandwidth (BW) and/or in the large-size RU aggregation mode is used, the receiving STA (for example, STA 120a) can have different options for transmitting the CTS frame. Two exemplary punctured CTS transmission rules are discussed in FIGS. 3A and 3B.

Figure 3A:
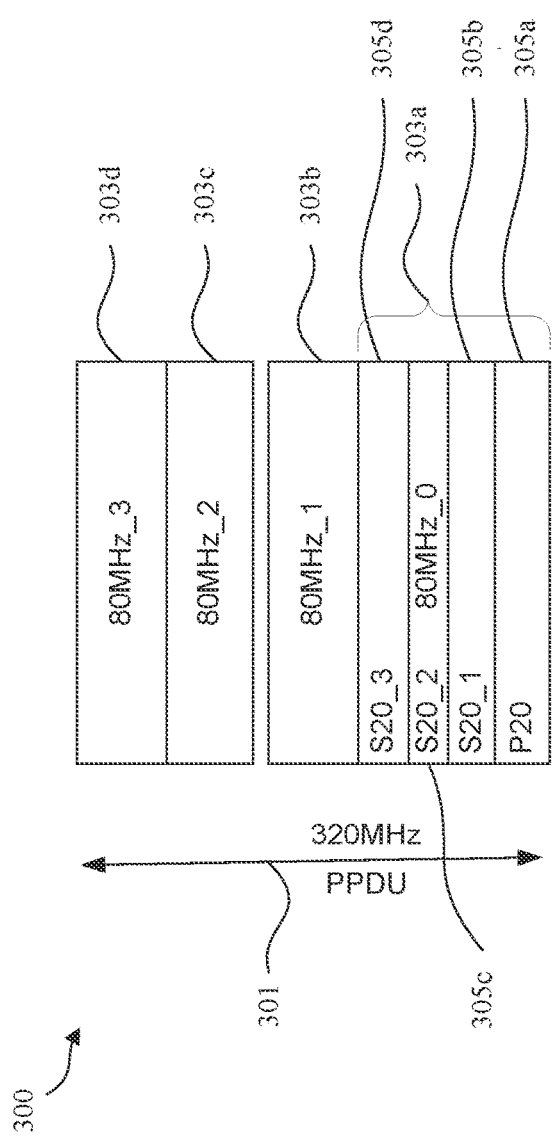
FIGS. 3A and 3B illustrate exemplary punctured CTS transmission rules, according to some aspects of the disclosure.

FIG. 3A illustrates an exemplary punctured CTS transmission rule 300, according to some aspects of the disclosure. As one non-limiting example, the frame BW 301 (for example, the PPDU BW) is 320 MHz and includes four segments 303a-303d (collectively referred to as segments 303). Each of segments 303 can have a BW of 80 MHz. According to some examples, segment 303a can be divided into four sub-channels 305a-305d each having a BW of 20 MHz. In some examples, sub-channel 305a can be the primary sub-channel and sub-channel 305c can be the puncture sub-channel. The exemplary punctured CTS transmission rule 300 is discussed with respect to channel 303a. However, similar punctured RTS transmission rule can be applied to other channels 303b-303d.

According to some aspects, in punctured CTS transmission rule 300, the CTS frame is transmitted on all sub-channels on which the RTS frame was received and that have CCA idle. In other words, for STA 120a to transmit its CTS frame, STA 120a can determine the sub-channel(s) on which STA 120 received the RTS frame from AP 110. Additionally, STA 120a can use one or more CCA mechanisms to determine the sub-channel(s) that are idle. STA 120a can transmit the CTS frame on all sub-channels on which the RTS frame was received and that have CCA idle. For example, assuming that sub-channels 305a, 305b, and 305d are CCA idle, and the RTS frame was received at STA 120a on sub-channels 305a, 305b, and 305d, STA 120a transmits the CTS frame on sub-channels 305a, 305b, and 305d, according to some aspects. As another example, assuming that sub-channels 305a, 305b, and 305d are CCA idle, and the RTS frame was received at STA 120a on sub-channels 305a and 305d, STA 120a transmits the CTS frame on sub-channels 305a and 305d, according to some aspects. According to some examples, punctured CTS transmission rule 300 of FIG. 3A can simplify the CTS transmission logic.

According to some aspects, if one or more segments (for example, segment 303b) does not include any puncture sub-channel and all sub-channels of segment 303b are CAA idle and were used to receive the RTS frame, STA 120a can transmit the CTS frame on each sub-channel of segment 303b.

Figure 3B:
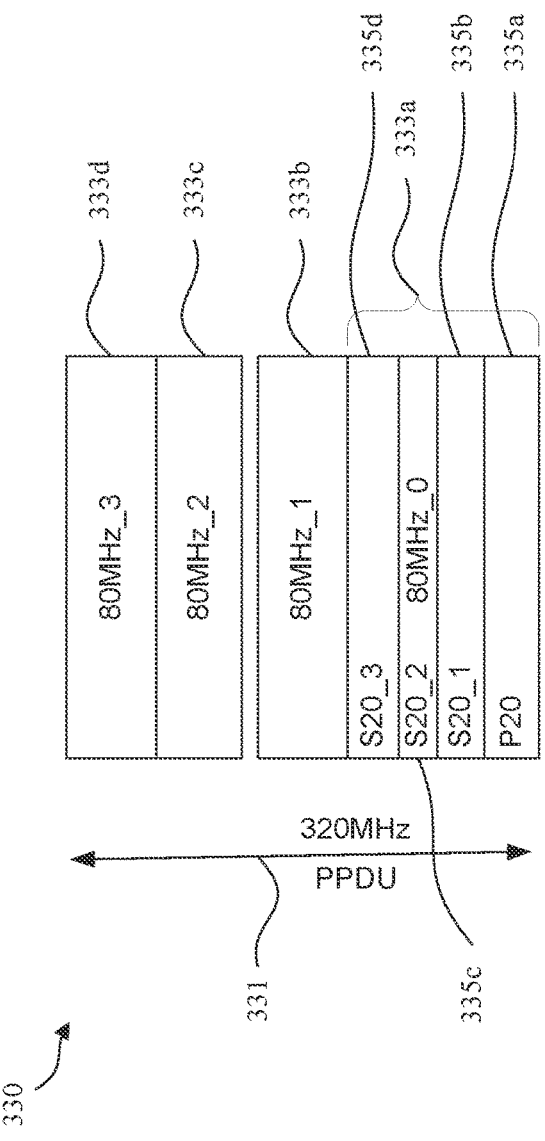

FIG. 3B illustrates another exemplary punctured CTS transmission rule 330, according to some aspects of the disclosure. As one non-limiting example, the frame BW 331 (for example, the PPDU BW) is 320 MHz and includes four segments 333a-333d (collectively referred to as segments 333). Each of segments 333 can have a BW of 80 MHz. According to some examples, segment 333a can be divided into four sub-channels 335a-335d each having a BW of 20 MHz. In some examples, sub-channel 335a can be the primary sub-channel and sub-channel 335c can be the puncture sub-channel. The exemplary punctured CTS transmission rule 330 is discussed with respect to channel 333a. However, similar punctured RTS transmission rule can be applied to other channels 333b-333d.

According to some aspects, in punctured CTS transmission rule 300, the CTS frame is transmitted only on sub-channels on which the RTS frame was received, that have CCA idle, and that yield large-size RU aggregation mode, as discussed above. In other words, for STA 120a to transmit its CTS frame, STA 120a can determine the sub-channel(s) on which STA 120 received the RTS frame from AP 110. Additionally, STA 120a can use one or more CCA mechanisms to determine the sub-channel(s) that are idle. Additionally, STA 120a can determine the sub-channel(s) that yield large-size RU aggregation mode. STA 120a can transmit the CTS frame only sub-channels on which the RTS frame was received, that have CCA idle, and that yield large-size RU aggregation mode. For example, assuming that sub-channels 305a, 305b, and 305d are CCA idle, and the RTS frame was received at STA 120a on sub-channels 305a, 305b, and 305d, STA 120a transmits the CTS frame on sub-channels 305a and 305b, according to some aspects. In this example, sub-channels 305a and 305b are aggregated to yield large-size RU aggregation mode.

According to some aspects, if one or more segments (for example, segment 333b) does not include any puncture sub-channel and all sub-channels of segment 333b are CAA idle and were used to receive the RTS frame, STA 120*a* can transmit the CTS frame on each sub-channel of segment 333*b*.

Although punctured CTS transmission rules 300 and 330 are discussed with respect to a frame BW of 320 MHz, four channels of 80 MHz, and sub-channels of 20 MHz, the aspects of this disclosure are not limited to these examples, and other values for the frame BW, large-size RU aggregation mode, channels, and/or sub-channels can be used.

Figure 4:
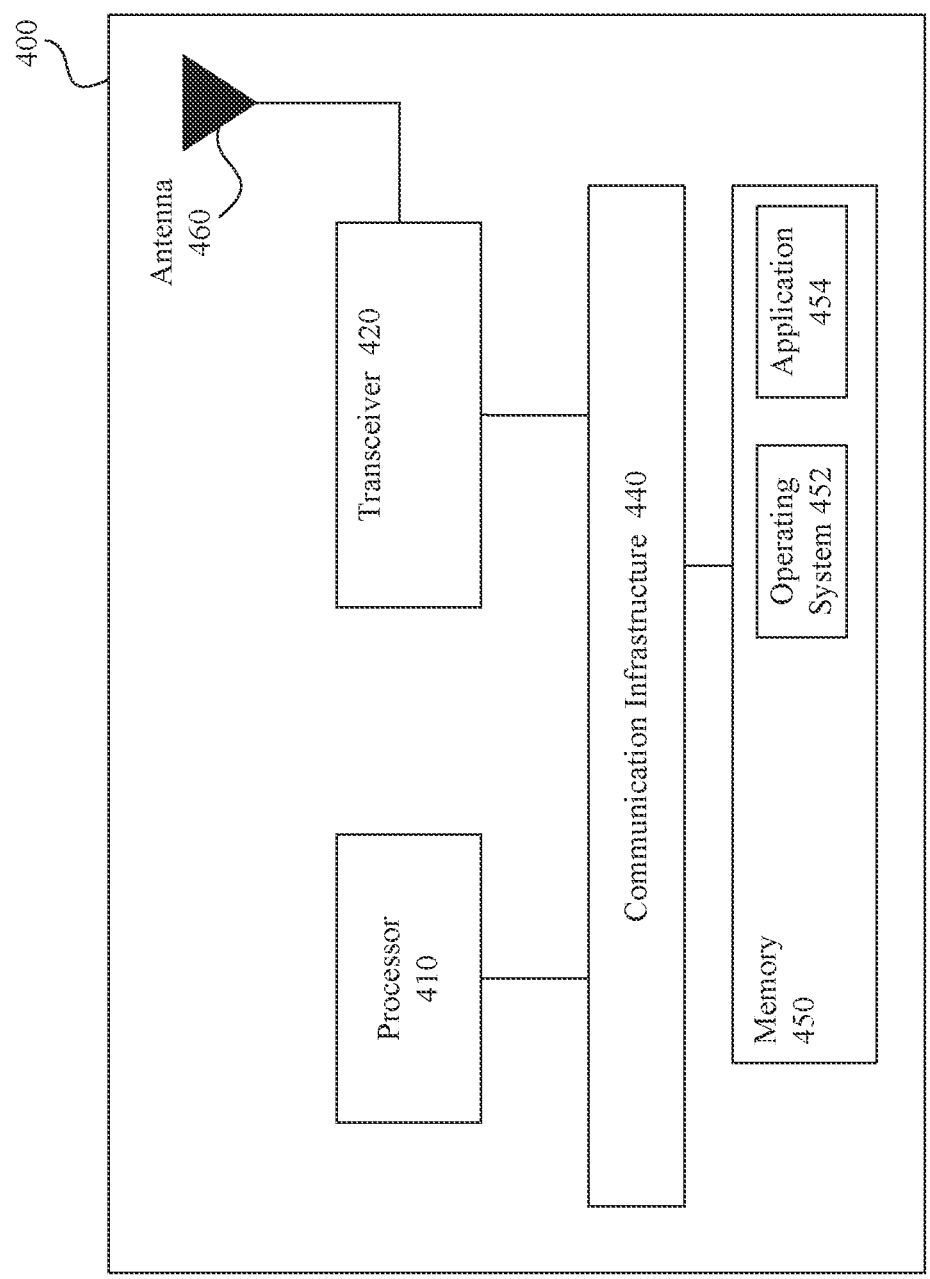
FIG. 4 illustrates a block diagram of an example wireless system of an electronic device implementing the RTS/CTS frames and transmission rules, according to some aspects of the disclosure.

FIG. 4 illustrates a block diagram of an example wireless system 400 of an electronic device implementing the RTS/CTS frames and transmission rules, according to some aspects of the disclosure. System 400 may be any of the electronic devices (e.g., AP 110, STA 120) of system 100. System 400 includes processor 410, transceiver 420, communication infrastructure 440, memory 450, operating system 452, application 454, and antenna 460. Illustrated systems are provided as exemplary parts of wireless system 400, and system 400 can include other circuit(s) and subsystem(s). Also, although the systems of wireless system 400 are illustrated as separate components, the aspects of this disclosure can include any combination of these, less, or more components.

Memory 450 may include random access memory (RAM) and/or cache, and may include control logic (e.g., computer software) and/or data. Memory 450 may include other storage devices or memory such as, but not limited to, a hard disk drive and/or a removable storage device/unit. According to some examples, operating system 452 can be stored in memory 450. Operating system 452 can manage transfer of data from memory 450 and/or one or more applications 454 to processor 410 and/or transceiver 420. In some examples, operating system 452 maintains one or more network protocol stacks (e.g., Internet protocol stack, cellular protocol stack, and the like) that can include a number of logical layers. At corresponding layers of the protocol stack, operating system 452 includes control mechanism and data structures to perform the functions associated with that layer.

According to some examples, application 454 can be stored in memory 450. Application 454 can include applications (e.g., user applications) used by wireless system 400 and/or a user of wireless system 400. The applications in application 454 can include applications such as, but not limited to, Siri™, FaceTime™, radio streaming, video streaming, remote control, and/or other user applications.

Alternatively or in addition to the operating system, system 400 can include communication infrastructure 440. Communication infrastructure 440 provides communication between, for example, processor 410, transceiver 420, and memory 450. In some implementations, communication infrastructure 440 may be a bus. Processor 410 together with instructions stored in memory 450 perform operations enabling wireless system 400 of system 100 to implement the RTS/CTS frames and transmission rules as described herein. Additionally or alternatively, transceiver 420 performs operations enabling wireless system 400 of system 100 to implement the RTS/CTS frames and transmission rules as described herein.

Transceiver 420 transmits and receives communications signals that support the RTS/CTS frames and transmission rules, according to some aspects, and may be coupled to antenna 460. Antenna 460 may include one or more antennas that may be the same or different types. Transceiver 420 allows system 400 to communicate with other devices that may be wired and/or wireless. Transceiver 420 can include processors, controllers, radios, sockets, plugs, buffers, and like circuits/devices used for connecting to and communication on networks. According to some examples, transceiver 420 includes one or more circuits to connect to and communicate on wired and/or wireless networks. Transceiver 420 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 420 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, etc.).

According to some aspects, processor 410, alone or in combination with memory 450, and/or transceiver 420, implements the RTS/CTS frames and transmission rules. For example, processor 410, alone or in combination with transceiver 420 and/or memory 405 can transmit RTS frames and/or CTS frames based on transmission rules discussed with respect to FIGS. 2A, 2B, 3A, and/or 3B. Additionally or alternatively, processor 410, alone or in combination with transceiver 420 and/or memory 405 can generate RTS frames and CTS frames as discussed with respect to FIGS. 5, 6A, and 6B. Additionally or alternatively, processor 410, alone or in combination with transceiver 420 and/or memory 405 can perform operations as discussed with respect to FIGS. 7-9.

According to some aspects of this disclosure, different frame formats can be used for RTS frame(s) and CTS frame(s). According to some examples, BW signaling target address (TA) method used in IEEE 802.11 standards (such as but not limited to IEEE 802.11ac) can be extended as exemplary RTS frame(s) and/or CTS frame(s). However, in some examples, extending BW signaling TA method can have feasibility issue(s) due to lack of bits available for repurposing. According to some aspects, new RTS frame(s) and CTS frame(s) can be defined. However, defining new RTS frames may result in HE devices not being able to reset NAV using the new RTS frame(s). In other words, using the new RTS frame(s) can lose backward capability and can result in legacy devices operating in, for example, IEEE 802.11ax, not being able to reset their NAV and therefore, not being able to transmit their data.

According to some aspects, HE MU-RTS Trigger frame can be adapted and used for exemplary RTS frame(s). In these examples, HE STAs will be able to reset NAV using the MU-RTS frame. For example, a STA can use the MU-RTS frame followed by no CTS frame and no data for a predefined period of time to clear NAV. In other words, the MU-RTS frame can be backward compatible and can be used by STAs operating based on, for example, IEEE 802.11ax. Additionally, the MU-RTS frames can be used by extremely high throughput (EHT) STAs too. For example, by STAs operating based on IEEE 802.11be.

Figure 5:
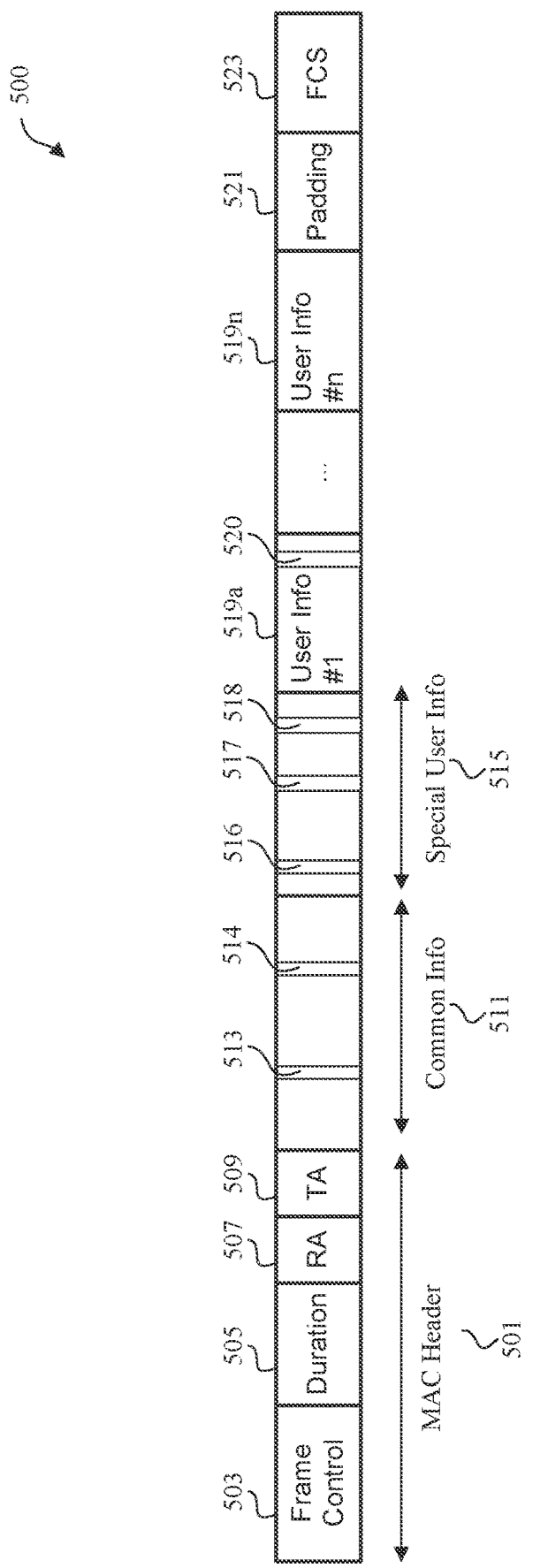
FIG. 5 illustrates an exemplary frame format for a multi-user (MU) RTS (MU-RTS) frame, according to some aspects of the disclosure.

FIG. 5 illustrates an exemplary frame format for an RTS frame 500, according to some aspects of the disclosure. RTS frame 500 illustrates a format for an RTS frame, which is also referred to herein as the multi-user (MU) RTS (MU-RTS) frame and/or MU-RTS Trigger frame. According to some aspects, MU-RTS frame 500 can signal the bandwidth (BW) of MU-RTS frame 500 (and/or the BW of the PPDU carrying MU-RTS frame 500) to receiving STAs. In some examples, MU-RTS frame 500 can signal the bandwidth to STAs operating in, for example, IEEE 802.11be (e.g., EHT STAs). Additionally, MU-RTS frame 500 can signal the bandwidth to STAs operating in, for example, IEEE 802.11ax (e.g., HE STAs).

According to some aspects, MU-RTS frame 500 can include a medium access control (MAC) header 501. In some examples MAC header 501 can include fields such as, but not limited to, frame control field 503, duration field 505 and address(es) 507 and 509 (e.g., one or more source addresses, one or more destination addresses, etc.) For example, MAC header 501 can include receiver address (RA) 507. In some examples, different RTS frames can have different RAs. Additionally, or alternatively, MU-RTS frame 500 can use a broadcast address as RA 507. MAC header 501 can also include transmitter address (TA) 509. In some examples, MAC header 501 can include additional fields, such as but not limited to, sequence control field, quality of service (QoS) control field, etc.

Additionally, MU-RTS frame 500 can include fields such as, but not limited to, common info field 511, special user info field 515, user info fields 519a-519n. Additionally, MU-RTS frame 500 can include padding field 521 for additional padding to compensate for different lengths of different MU-RTS frames, and frame check sequence (FCS) 523 for error-detection. In some non-limiting examples, common info field 511 can have a length of 8 or more octets, special user info field 515 can have a length of 5 or more octets, user info fields 519a-519n can have lengths of 5 or more octets, padding field 521 can have a variable length, and FCS field 523 can have a length of 4 octets. However, the aspects of this disclosure are not limited to these lengths and fields, and other lengths and fields can also be used.

According to some aspects, common info field 511 can include one or more subfields such as, but not limited to, trigger type subfield, uplink (UP) length subfield, more TF subfield, carrier sensing (CS) required subfield, UL bandwidth (BW) subfield. Common info field 511 can include less or additional subfields. According to some aspects, special user info field 515 and user info fields 519a-519n can include one or more subfields such as, but not limited to, association identifier (AID) subfield, RU allocation subfield, UL forward error correction (FEC) coding type subfield, UL modulation and coding scheme (MCS) subfield, UL dynamic coding and modulation (DCM) subfield. Special user info field 515 and user info fields 519a-519n can include less or additional subfields.

According to some aspects, MU-RTS frame 500 can use a first subfield in common info field 511 and a second subfield in special user info field 515 to signal to a receiving STA the bandwidth (BW) associated with MU-RTS frame 500 and/or BW associated with a PPDU carrying MU-RTS frame 500. For example, MU-RTS frame 500 can use UL BW subfield 513 of common info field 511 and BW subfield 517 in special user info field 515 to signal the BW associated with MU-RTS frame 500 and/or BW associated with a PPDU carrying MU-RTS frame 500. According to some examples, the BW includes, but is not limited to, 320 MHz, 160+160 MHz, 240 MHz, 160+80 MHz).

According to some aspects, upon receiving MU-RTS 500, an extremely high throughput (EHT) STA (e.g., an STA operating in IEEE 802.11be) can read UL BW subfield 513 of common info field 511 and BW subfield 517 in special user info field 515 to determine the BW associated with MU-RTS frame 500 and/or BW associated with a PPDU carrying MU-RTS frame 500. Additionally, or alternatively, upon receiving MU-RTS 500, a high efficiency (HE) STA (e.g., an STA operating in IEEE 802.11ax) can read UL BW subfield 513 of common info field 511 to determine the BW associated with MU-RTS frame 500 and/or BW associated with a PPDU carrying MU-RTS frame 500.

In some examples, UL BW subfield 513 of common info field 511 can be set to 20, 40, 80, 160/80+80, if BW associated with MU-RTS frame 500 and/or BW associated with a PPDU carrying MU-RTS frame 500 is equal to or less than 160 MHz. In some examples, UL BW subfield 513 of common info field 511 can be set to 160/80+80, if BW associated with MU-RTS frame 500 and/or BW associated with a PPDU carrying MU-RTS frame 500 is greater than 160 MHz. BW subfield 517 in special user info field 515 can be used in addition to UL BW subfield 513 of common info field 511 to signal the BW when BW is greater than 160 MHz.

According to some aspects, special user info field 515 can include AID subfield 516. AID subfield 516 can have a predefined value to indicate that field 515 is the special user info field. In other words, in some RTS frames, field 515 can be similar to user info field 519a-519n. However, by using a predefined value (for example, a reserved AID value) for AID subfield 516, MU-RTS frame 500 indicates that field 515 is special user info field.

According to some aspects, special user info field 515 can include puncture pattern 518. In some examples, puncture pattern 518 can include a bitmap. As a non-liming example, puncture pattern 518 can be a 16-bit bitmap. Each bit in the bitmap maps to a sub-channel. For example, each bit in the bitmap can map to sub-channels 205a-205d of segment 203a of FIG. 2A (and/or sub-channels 235a-235d of segment 233a of FIG. 2B). Additionally, each bit in the bitmap can map to sub-channels of segments 203b-203d of FIG. 2A (and/or sub-channels of segments 233b-233d of FIG. 2B). For example, a value of "1" of a bit in bitmap 518 can indicate that MU-RTS frame 500 is transmitted on the sub-channel associated with that bit. A value of "0" of a bit in bitmap 518 can indicate that MU-RTS frame 500 is not transmitted on the sub-channel associated with that bit.

According to some aspects, MU-RTS frame 500 can be transmitted on an uplink and a downlink. In other words, MU-RTS frame 500 can be transmitted by AP 110 to one or more STAs 120. Also, MU-RTS frame 500 can be transmitted by a non-AP STA (e.g., STAs 120) to AP 110. According to some aspects, user info field 519a also include AID subfield 520. According to some examples, MU-RTS frame 500 can be transmitted by an AP (e.g., AP 110) to a non-AP STA (e.g., STA 120a). In some examples, when MU-RTS frame 500 is transmitted by the AP, AID subfield 520 can be set to the AID of the non-AP STA (e.g., STA 120a) that is being triggered for CTS response by MU-RTS frame 500. Additionally, or alternatively, MU-RTS frame 500 can be transmitted by a non-AP STA (e.g., STA 120a). MU-RTS frame 500 can be transmitted to another non-AP STA (e.g., STA 120b) and/or to an AP (e.g., AP 110). When MU-RTS frame 500 is transmitted by the non-AP STA (e.g., STA 120a), AID subfield 520 can be set to the AID of the non-AP STA (e.g., STA 120a) that is transmitting MU-RTS 500. Alternatively, When MU-RTS frame 500 is transmitted by the non-AP STA (e.g., STA 120a), AID subfield 520 can be set to value "0" (e.g., reserved) or some other predefined value.

According to some examples, the MU-RTS frame 500 can be carried in a non-HT (high throughput) PPDU or a non-HT DUP (duplicate) PPDU.

According to some aspects, after receiving the MU-RTS frame 500 from the transmitting STA (e.g., AP 110), the receiving STA (e.g., STA 120a) can send a CTS frame back to the transmitting STA if the channel is clear for the transmitting STA to transmit its data. In some examples, the receiving STA can send the CTS frame after a time period (for example, SIFS) to the transmitting STA to indicate that the channel is free and AP 110 can send its data. According to some aspects, MU-RTS 500 is transmitted to a plurality of receiving STAs. Each receiving STA can send its CTS frame back to the transmitting STA. Alternatively, MU-RTS 500 can be transmitted to only one receiving STA. The receiving STA can send its CTS frame back to the transmitting STA.

Figure 6A:
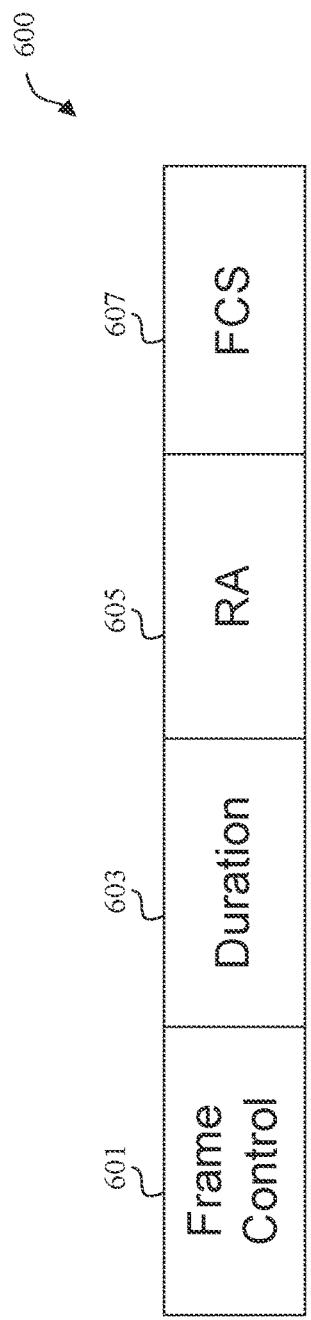
FIGS. 6A and 6B illustrate exemplary frame formats for a CTS frame, according to some aspects of the disclosure.

FIG. 6A illustrates an exemplary frame format for a CTS frame 600, according to some aspects of the disclosure. According to some aspects, the receiving STA that receives MU-RTS frame 500 from the transmitting STA uses CTS frame 600 when MU-RTS frame 500 indicates that this MU-RTS is eliciting response(s) from more than one STA. In some examples, CTS frame 600 has a format same as or similar to a CTS frame format as used in IEEE 802.11 standards such as, but not limited to, IEEE 802.11ax. According to some examples, the receiving STA determines that the received MU-RTS 500 elicits response from more than one STA based on the user info fields 519a-519n. In other words, MU-RTS 500 includes more than one user info fields. Additionally, or alternatively, the receiving STA determines that the received MU-RTS 500 elicits response from more than one STA based on RA field 507. For example, RA field 507 can include more than one receiving addresses and/or a multicast or broadcast address. Although some examples are provided in this disclosure, the aspects of this disclosure are not limited to these examples, and the receiving STA can use other information in MU-RTS 500 to determine that the received MU-RTS 500 elicits response from more than one STA.

According to some examples, CTS frame 600 can include one or more fields including, but not limited to, frame control field 601, duration field 603, RA field 605, and FCS field 607. Frame control field 601 can include a value to indicate that frame 600 is a CTS frame. Duration field 603 can include a value used from duration 505 from MU-RTS frame 500. RA field 605 includes the address of the receiver of CTS frame 600 (for example, the address of the transmitter of RTS frame 500). FCS field 607 is frame check sequence for error-detection. In some examples, frame control field 601 can have a length of 2 bytes, duration field 603 can have a length of 2 bytes, RA field 605 can have a length of 6 bytes, and FCS field 607 can have a length of 4 bytes. In some examples, frame control field 601, duration field 603, and RA field 605 can make up the MAC header of CTS frame 600. It is noted that CTS frame 600 can include other, less, or more fields with other exemplary lengths. In some examples, CTS frame 600 does not indicate a reserved BW because the CTS frames transmitted by different STAs are to be identical. In some examples, CTS frame 600 can be carried in a non-HT PPDU or a non-HT DUP PPDU.

Figure 6B:
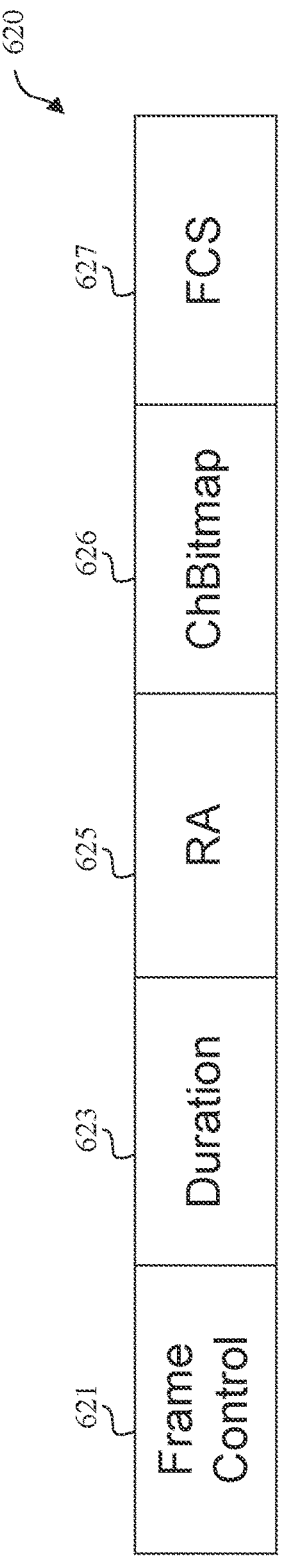

FIG. 6B illustrates an exemplary frame format for a CTS frame 620, according to some aspects of the disclosure. According to some aspects, the receiving STA that receives MU-RTS frame 500 from the transmitting STA uses CTS frame 620 when MU-RTS frame 500 indicates that this MU-RTS is eliciting response from more one STA. According to some examples, the receiving STA determines that the received MU-RTS 500 elicits response from one STA based on the user info fields 519a-519n. In other words, MU-RTS 500 includes one user info field. Additionally, or alternatively, the receiving STA determines that the received MU-RTS 500 elicits response from one STA based on RA field 507. For example, RA field 507 can include one receiving address. Although some examples are provided in this disclosure, the aspects of this disclosure are not limited to these examples, and the receiving STA can use other information in MU-RTS 500 to determine that the received MU-RTS 500 elicits response from one STA.

According to some examples, CTS frame 620 (also referred herein as extremely high throughput CTS (ehtCTS)) can include one or more fields including, but not limited to, frame control field 621, duration field 623, RA field 625, channel bitmap field 626, and FCS field 627. Frame control field 621 can include a value to indicate that frame 620 is a CTS frame. In some examples, frame control field 621 can include a value to indicate that frame 620 is an ehtCTS frame. Duration field 623 can include a value used from duration 505 from MU-RTS frame 500. RA field 625 includes the address of the receiver of CTS frame 620 (for example, the address of the transmitter of RTS frame 500). FCS field 627 is frame check sequence for error-detection. In some examples, frame control field 621 can have a length of 2 bytes, duration field 623 can have a length of 2 bytes, RA field 625 can have a length of 6 bytes, and FCS field 627 can have a length of 4 bytes. In some examples, frame control field 621, duration field 623, and RA field 625 can make up the MAC header of CTS frame 620.

According to some aspects, channel bitmap field 626 of CTS frame 620 can indicate the sub-channel(s) on which CTS frame 620 is transmitted. For example, each bit in channel bitmap field 626 can map to sub-channels 305a-305d of segment 303a of FIG. 3A (and/or sub-channels 335a-235d of segment 333a of FIG. 3B). Additionally, each bit in channel bitmap field 626 can map to sub-channels of segments 303b-303d of FIG. 3A (and/or sub-channels of segments 333b-333d of FIG. 3B). For example, a value of "1" of a bit in channel bitmap field 626 can indicate that CTS frame 620 is transmitted on the sub-channel associated with that bit. A value of "0" of a bit in channel bitmap field 626 can indicate that CTS frame 620 is not transmitted on the sub-channel associated with that bit.

Additionally, or alternatively, channel bitmap field 626 of CTS frame 620 can be used to indicate the reserved BW allowing any STA to determine the reserved BW by receiving the CTS frame 620 on, for example, at least a primary channel (for example, a primary 20 MHz channel). For example, by using channel bitmap field 626 (that can indicate the sub-channel(s) on which CTS frame 620 is transmitted and the sub-channel(s) on which CTS frame 620 is not transmitted), any receiving STA can determine the reserved BW.

In some examples, CTS frame 620 can be carried in a non-HT PPDU or a non-HT DUP PPDU.

It is noted that frame format of CTS frame 620 in FIG. 6B is provided as one example. CTS frame 620 can have other formats as long as the format includes and/or indicates a channel bitmap indicating the sub-channel(s) on which CTS frame 620 is transmitted. Additionally, or alternatively, other frame formats of CTS frame 620 can include an indication of the CTS frame's reserved BW allowing any STA to determine the reserved BW by receiving the CTS frame 620.

According to some examples, a subfield (including one or more bits) in common info field 511 of MU-RTS frame 500 can indicate to the receiving STA which CTS frame (CTS frame 600 or CTS frame 620) to use in response to MU-RTS frame 500. For example, MU-RTS frame 500 can include subfield 514 to indicate to the receiving STA to use CTS frame 600 or CTS frame 620. For example, subfield 514 can be set to a first value (e.g., value "1") to use CTS frame 620 and can be set to a second value (e.g., value "0") to use CTS frame 600. In some example, a bit from UL HE-SIG-A2 Reserved field in MU-RTS frame 500 can be used as subfield 514.

According to some aspects, a receiving STA (for example, STA 120a) that receives the MU-RTS frame (for example, MU-RTS frame 500) can use one or more CCA mechanisms before generating and transmitting the CTS frame (for example, CTS frame 600 and/or 620). According to some examples, the receiving STA can use HE CCA rules (for example, as used in IEEE 802.11ax) as CCA mechanisms to check the medium. For example, the receiving STA can use one or more the virtual carrier sense (CS) mechanism and/or energy detection (ED) based mechanism during a predefined time period (for example, SIFS) after receiving the MU-RTS frame (for example, MU-RTS frame 500) to determine the state of the medium on non-punctured sub-channels. For example, the receiving STA can use a combination of the virtual CS and the ED-bases mechanisms as the CCA mechanism. In some examples, only non-primary channels are punctured.

According to some aspects, if the MU-RTS frame (for example, MU-RTS frame 500) is eliciting response from more than one STA, the receiving STA transmits the CTS frame (for example, CTS frame 600) only when all the sub-channels (for example, 20 MHz sub-channels) contained in the allocated RU are CCA idle.

Additionally, or alternatively, if the MU-RTS frame (for example, MU-RTS frame 500) is eliciting response from only one STA, the receiving STA transmits the CTS frame (for example, CTS frame 620—ehtCTS frame) on a primary sub-channel (for example, primary 20 MHz sub-channel) and on any other sub-channel(s) (for example, 20 MHz sub-channels) contained in the allocated RU that are CCA idle.

Figure 7:
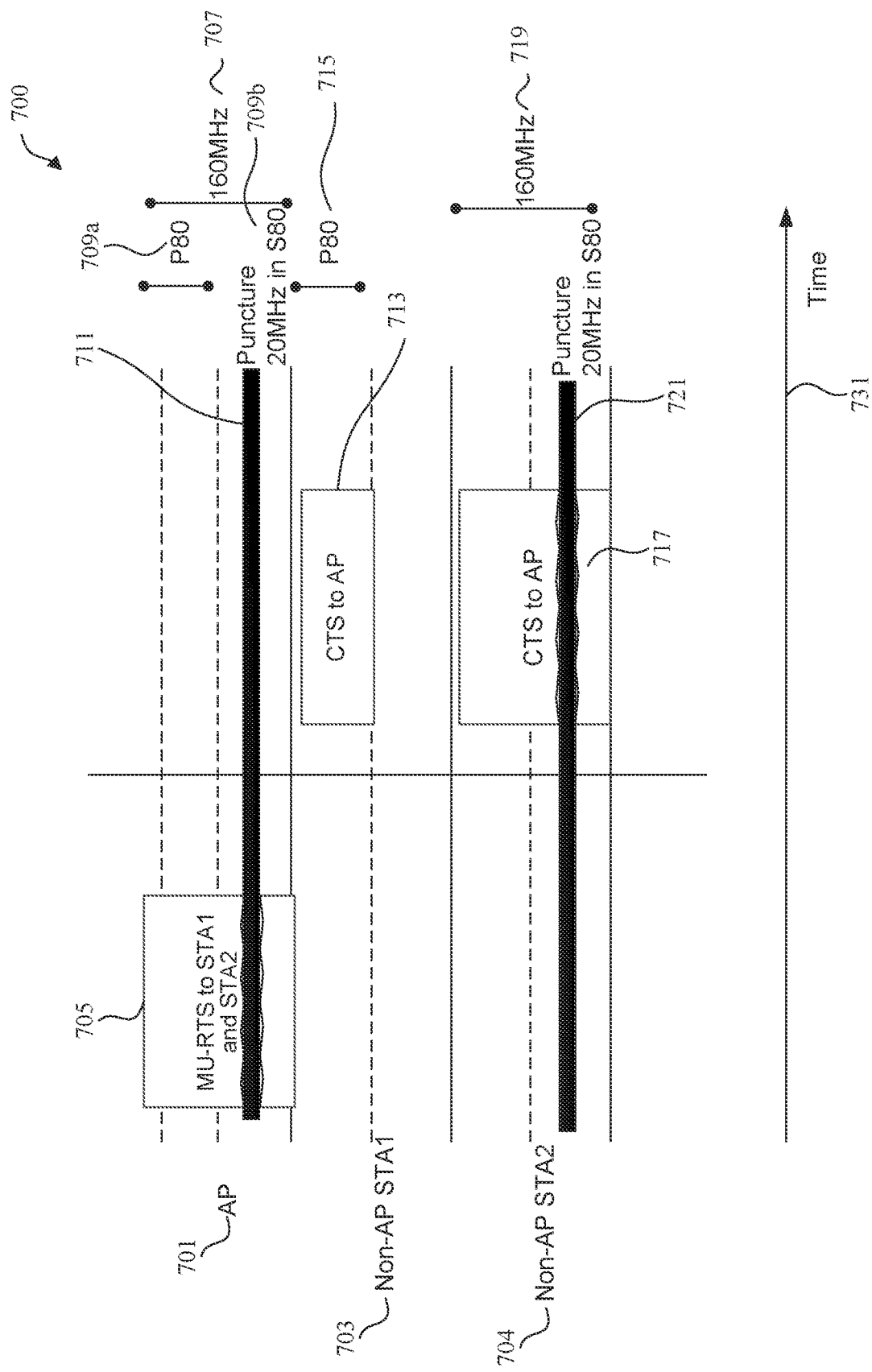
FIG. 7 illustrates an exemplary MU-RTS and CTS frames exchange, according to some aspects of the disclosure.

An example of this process is further discussed with respect to FIG. 7. FIG. 7 illustrates an exemplary MU-RTS and CTS frames exchange over time and frequency, according to some aspects of the disclosure. As a convenience and not a limitation, operation 700 of FIG. 7 may be described with regard to elements of FIGS. 1-6. Operation 700 represents the communication between multiple electronic devices—AP 701 and non-AP STAs 703 and 704. According to some examples, AP 701 can include AP 110 of FIG. 1 and non-AP STAs 703 and 704 can include STAs 120 of FIG. 1.

According to some aspects, AP 701 can transmit MU-RTS frame 705 to STA 703 and STA 704. In some examples, the MU-RTS frame 705 (or the PPDU carrying MU-RTS frame 705) has bandwidth (BW) 707. In a non-limiting example, BW 707 can be 160 MHz. BW 707 can include two segments—primary segment 709a and secondary segment 709b each being, for example, 80 MHz. Segment 709b can also include the puncture sub-channel 711 with a bandwidth of 20 MHz. However, segments 707 and 709 can include other bandwidths as discussed above. According to some examples, AP 701 transmits MU-RTS frame 705 in non-HT DUP PPDU.

According to some aspects, MU-RTS frame 705 can request STA 703 to transmit a CTS response in a non-HT PPDU with BW 715 and can request STA 704 to transmit a CTS response in a non-HT DUP PPDU with 719. STAs 703 and 704 can use virtual CS and/or ED-based CCA during SIFS after receiving MU-RTS 705 to determine the channel states (e.g., whether the medium/channel is idle or busy). In response to CCA idle, STAs 703 and 704 can transmit their respective CTS frames 713 and 717.

According to some aspects, STA 703 transmits CTS frame 713 in a non-HT PPDU as requested by MU-RTS frame 705. In some examples, CTS frame 713 can be based on CTS frame 600 of FIG. 6A. STA 703 transmits CTS frame 713 with BW 715. In some examples, BW 715 is same as BW 709a. In this example, all BW 715 (BW 709) was CCA idle.

According to some aspects, STA 704 transmits CTS frame 717 in a non-HT DUP PPDU as requested by MU-RTS frame 705. In some examples, CTS frame 717 can be based on CTS frame 600 of FIG. 6A. STA 704 transmits CTS frame 717 with BW 719. In some examples, STA 704 does not transmit the CTS frame 717 on puncture sub-channel 721. In some examples, BW 719 is same as BW 707 and puncture sub-channel 721 is same as puncture sub-channel 711. In this example, STA 704 transmits CTS frame 717 only when all the sub-channels on BW 719 (BW 707) is CCA idle, excluding the puncture sub-channel 721 (puncture sub-channel 711).

Figure 8:
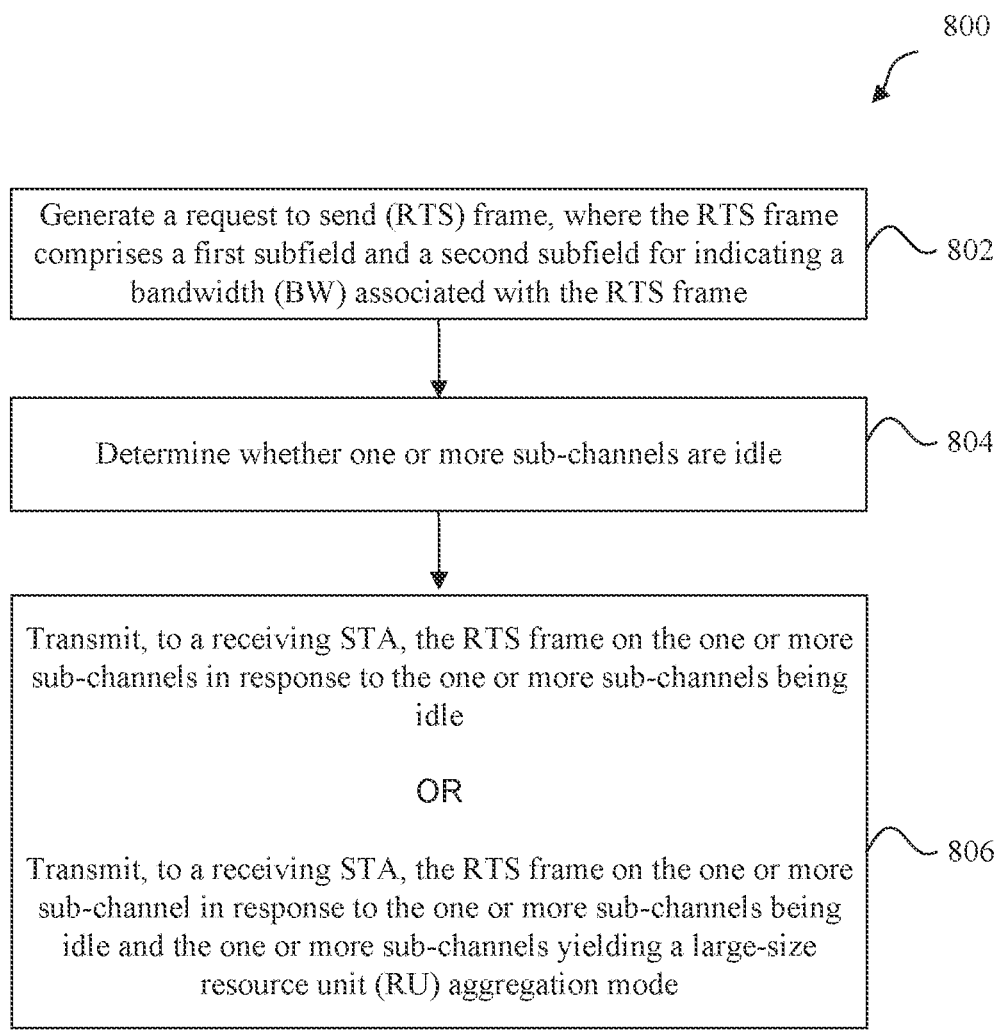
FIG. 8 illustrates an example method for a wireless system generating and transmitting an RTS frame, according to some aspects of the disclosure.

FIG. 8 illustrates an example method 800 for a wireless system generating and transmitting an RTS frame, according to some aspects of the disclosure. As a convenience and not a limitation, FIG. 8 may be described with regard to elements of FIGS. 1-7. Method 800 may represent the operation of a station (for example, AP 110 and/or STA 120a of FIG. 1) generating and transmitting an RTS frame. Method 800 may also be performed by system 400 of FIG. 4 and/or computer system 1000 of FIG. 10. But method 800 is not limited to the specific aspects depicted in those figures and other systems may be used to perform the method as will be understood by those skilled in the art. It is to be appreciated that not all operations may be needed, and the operations may not be performed in the same order as shown in FIG. 8.

At 802, a request to send (RTS) frame is generated. For example, a transmitting STA (for example, AP 110 of FIG. 1) that has data to send to a receiving STA (for example, STA 120a of FIG. 1) generates the RTS frame. The transmitting STA generates the RTS frame to send to the receiving STA to reserve the medium for transmitting its data. According to some aspects, the RTS frame is generated based on MU-RTS frame 500 of FIG. 5. The RTS frame can be detected and decoded by an EHT STA (for example, STA working in IEEE 802.11be) and by an HE STA (for example, STA working in IEEE 802.11ax), according to some aspects.

For example, the RTS frame can include a MAC header (for example, MAC header 501 of FIG. 5), a common info field (for example, common info field 511 of FIG. 5), a special user info field (for example, special user info field 515 of FIG. 5), user info fields (for example, user info fields 519a-519n of FIG. 5), and other fields. According to some aspects, two subfields in RTS frame can be used to signal a bandwidth (BW) associated with the RTS frame to other STAs (for example, the receiving STA). In some examples, a first subfield (for example, UL BW subfield 513) and second subfield (for example, BW subfield 517) are used to indicate the BW associated with the RTS frame.

In some examples, the EHT STA (for example, STA working in IEEE 802.11be) receiving the RTS frame can detect and decode both subfields to determine the BW. On the other hand, the HE STA (for example, STA working in IEEE 802.11ax) can detect and decode the first subfield (for example, UL BW subfield 513).

According to some aspects, the RTS frame can also include another subfield (for example, subfield 514) to indicate to receiving STA which CTS frame (for example, CTS frame 600 or CTS frame 620) to use.

Additionally, or alternatively, the RTS frame can include a puncture pattern (for example, puncture pattern 518). In some examples, the puncture pattern can include a bitmap, where each bit in the bitmap maps to a sub-channel. For example, a value of "1" of a bit in the bitmap can indicate that the RTS frame is transmitted on the sub-channel associated with that bit. A value of "0" of a bit in the bitmap can indicate that the RTS frame is not transmitted on the sub-channel associated with that bit.

At 804, one or more sub-channels are examined to determine whether the sub-channel(s) are idle. After generating the RTS frame and before transmitting the RTS frame, the transmitting STA determines whether that at least one sub-channel is idle. The transmitting STA can use one or more CCA mechanisms, as discussed above, to determine the status of the medium.

Depending on the punctured RTS transmission rules (for example, as discussed in FIGS. 2A and 2B), the transmitting STA can transmit the RTS frame to the receiving STA. For example, at 806, the RTS frame is transmitted on sub-channels that are CCA idle. According to some aspects, the RTS frame is transmitted on all the sub-channels (for example, 20 MHz sub-channels) that are CCA idle. Alternatively, the RTS frame is transmitted on one or more sub-channels in response to the one or more sub-channels being idle and the one or more sub-channels yielding a large-size resource unit (RU) aggregation mode.

According to some aspects, the transmitting STA can receive a CTS frame from the receiving STA. In response to receiving the CTS frame, the transmitting STA can transmit its data to the receiving STA. Additionally, the transmitting STA can receiving an ACK from the receiving STA indicating that the receiving STA correctly received the data.

Figure 9:
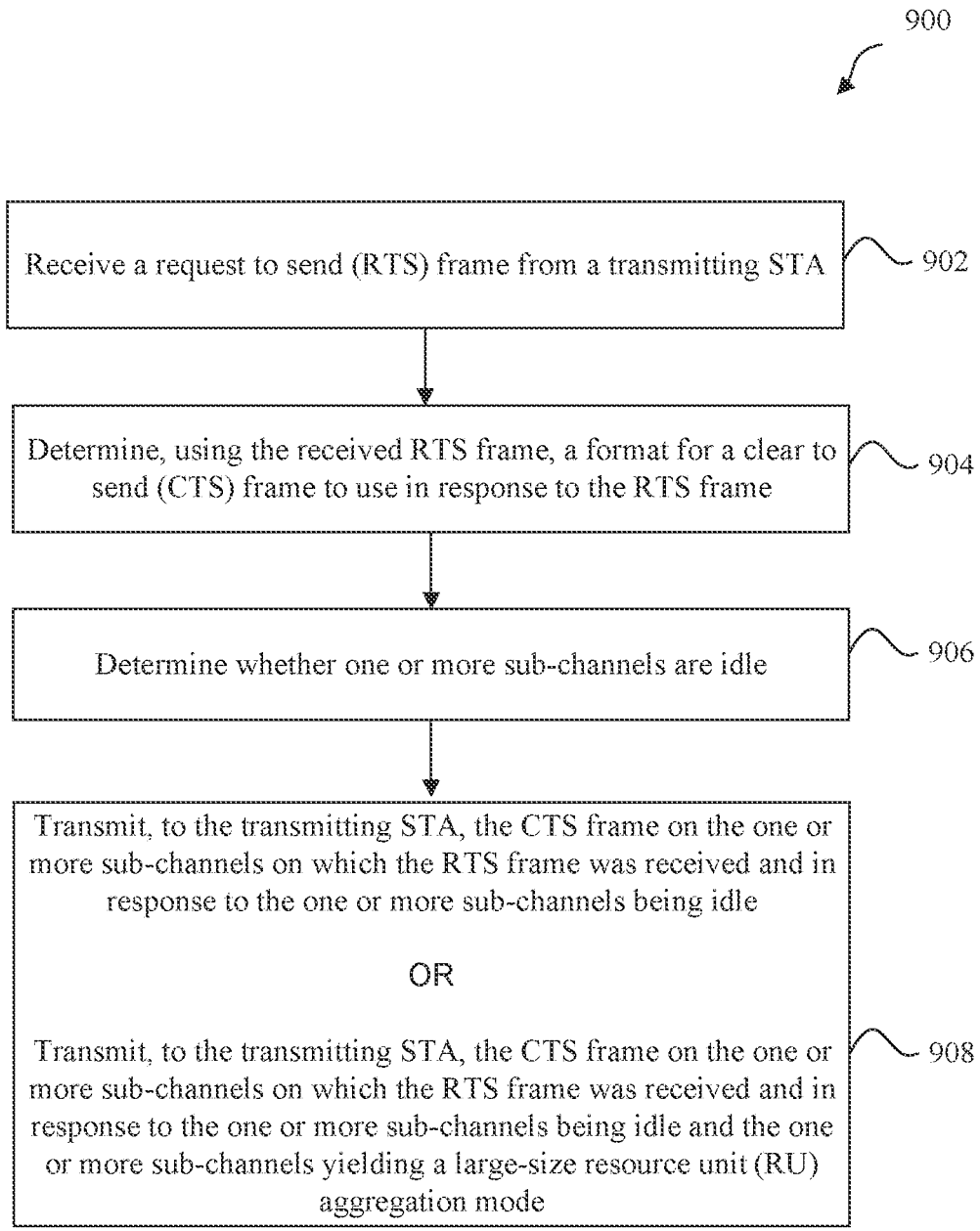
FIG. 9 illustrates an example method for a wireless system generating and transmitting a CTS frame, according to some aspects of the disclosure.

FIG. 9 illustrates an example method 900 for a wireless system generating and transmitting a CTS frame, according to some aspects of the disclosure. As a convenience and not a limitation, FIG. 9 may be described with regard to elements of FIGS. 1-7. Method 900 may represent the operation of a station (for example, AP 110 and/or STA 120a of FIG. 1) generating and transmitting an RTS frame. Method 900 may also be performed by system 400 of FIG. 4 and/or computer system 1000 of FIG. 10. But method 900 is not limited to the specific aspects depicted in those figures and other systems may be used to perform the method as will be understood by those skilled in the art. It is to be appreciated that not all operations may be needed, and the operations may not be performed in the same order as shown in FIG. 9.

At 902, a request to send (RTS) frame is received. For example, a receiving STA receiving the RTS frame from a transmitting STA. According to some aspects, the RTS frame can be a MU-RTS frame. In some examples, after receiving the RTS frame, the receiving STA can determine a bandwidth (BW) associated with the RTS frame and/or a PPDU carrying the RTS frame. For example, as discussed with respect to FIGS. 5 and 8, the receiving STA can examine one or two subfields in the RTS frame to determine the BW. Additionally, or alternatively, the receiving STA can examine a subfield in the RTS frame to determine one or more sub-channels on which the RTS frame was transmitted.

At 904, a format for a clear to send (CTS) frame to use in response to the RTS frame is determined using the received RTS frame. For example, the receiving STA determines whether the RTS frame is transmitted only to the receiving STA or the RTS frame is transmitted to more than one STA. In response to the RTS frame being transmitted only to the receiving STA, the receiving STA chooses frame format 620 of FIG. 6B for the CTS frame. In this example, the CTS frame can include a channel bitmap field (for example, channel bitmap field 626 of FIG. 6B) indicating the at least one sub-channel on which the CTS frame is transmitted. For example, a value of "1" of a bit in channel bitmap field can indicate that CTS frame is transmitted on the sub-channel associated with that bit. A value of "0" of a bit in channel bitmap can indicate that CTS frame is not transmitted on the sub-channel associated with that bit.

Alternatively, if the RTS frame is transmitted to more than one STA, the receiving STA chooses frame format 600 of FIG. 6A for the CTS frame.

According to some aspects, determining the format of the CTS frame can include examining a subfield in the RTS frame representing the format indicated by the transmitting STA. For example, the RTS frame can include a subfield (for example, subfield 514 of FIG. 5) to indicate to the receiving STA to use CTS frame 600 or CTS frame 620.

After determining the format for the CTS frame, the receiving STA can generate the CTS frame. At 906, one or more sub-channels are examined to determine whether the sub-channel(s) are idle. After generating the CTS frame and before transmitting the CTS frame, the receiving STA determines whether that at least one sub-channel is idle. The receiving STA can use one or more CCA mechanisms, as discussed above, to determine the status of the medium.

At 908, depending on the punctured CTS transmission rules (for example, as discussed in FIGS. 3A, 3B, and/or 7), the receiving STA can transmit the CTS frame to the transmitting STA. According to some aspects, the receiving STA transmits the CTS frame, based on the determined format, on one or more sub-channels on which the RTS frame was received and in response to the one or more sub-channels being idle.

Alternatively, the receiving STA transmits the CTS frame, based on the determined format, on one or more sub-channels on which the RTS frame was received and in response to the one or more sub-channels being idle and the one or more sub-channels yielding a large-size resource unit (RU) aggregation mode.

In some examples, the one or more sub-channels include a puncture sub-channel, and the receiving STA does not transmit the CTS frame on the puncture sub-channel.

According to some aspects, the receiving STA can receive date from the transmitting STA. In response to receiving the data, the receiving STA can transmit an ACK to the transmitting STA to indicate that the receiving STA correctly received the data.

Figure 10:
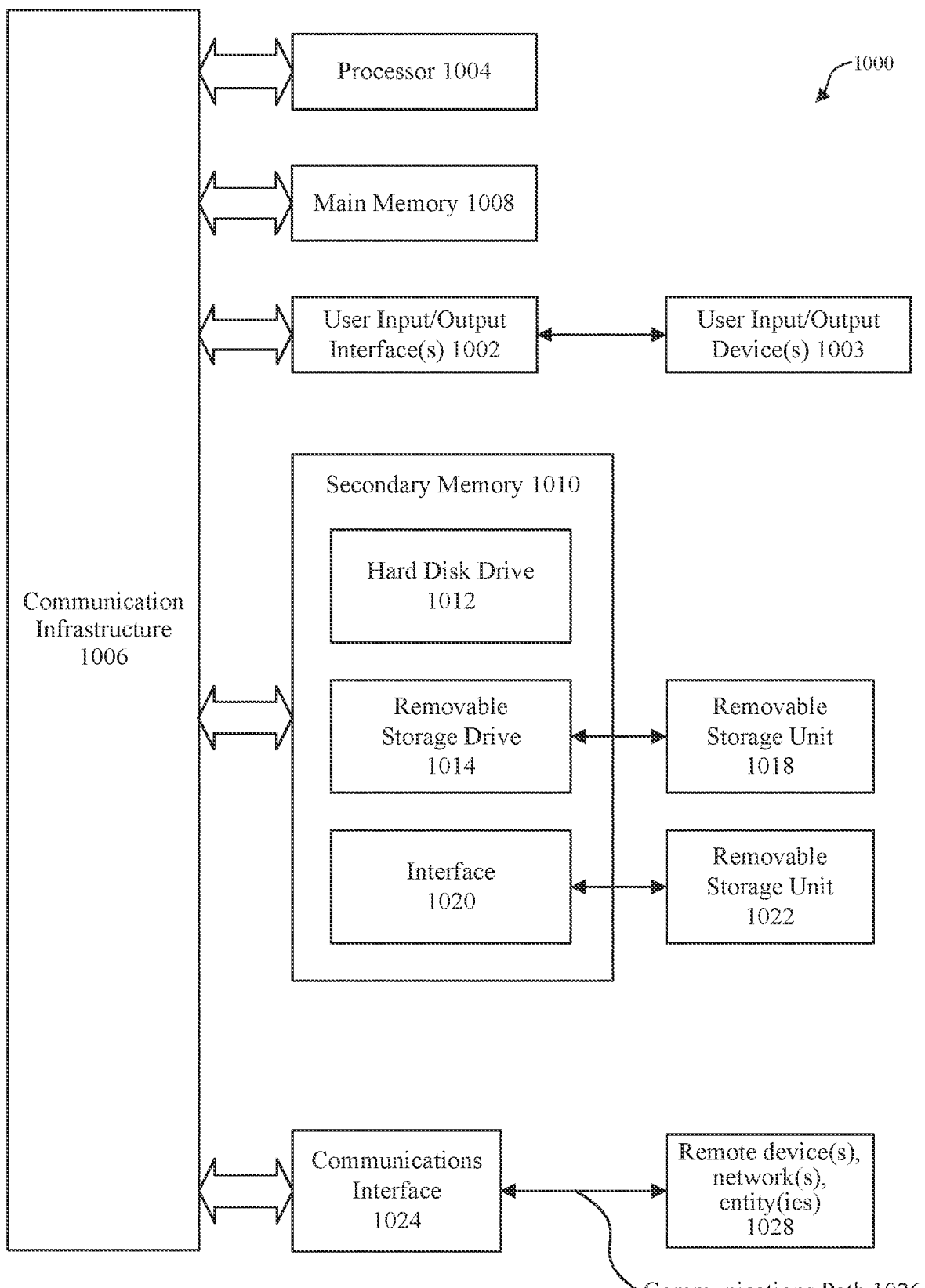
FIG. 10 is an example computer system for implementing some aspects or portion(s) thereof.

Various aspects can be implemented, for example, using one or more computer systems, such as computer system 1000 shown in FIG. 10. Computer system 1000 can be any well-known computer capable of performing the functions described herein such as devices 110, 120 of FIG. 1, or 400 of FIG. 4. Computer system 1000 includes one or more processors (also called central processing units, or CPUs), such as a processor 1004. Processor 1004 is connected to a communication infrastructure 1006 (e.g., a bus.) Computer system 1000 also includes user input/output device(s) 1003, such as monitors, keyboards, pointing devices, etc., that communicate with communication infrastructure 1006 through user input/output interface(s) 1002. Computer system 1000 also includes a main or primary memory 1008, such as random access memory (RAM). Main memory 1008 may include one or more levels of cache. Main memory 1008 has stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to some aspects, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1000, main memory 1008, secondary memory 1010 and removable storage units 1018 and 1022, as well as tangible articles of manufacture embodying any combination of the foregoing.

Such control logic, when executed by one or more data processing devices (such as computer system 1000), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 10. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "aspects," "one aspect," "one embodiment," "an embodiment," "an example embodiment," or similar phrases, indicate that the embodiment described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:
   a transceiver configured to communicate with a second electronic device; and
   one or more processors communicatively coupled to the transceiver and configured to:
   receive, using the transceiver, a request to send (RTS) frame sent by the second electronic device;
   determine, based at least on the received RTS frame, a clear to send (CTS) frame format to transmit in response to the RTS frame; and
   transmit, using the transceiver, a CTS frame based at least on the determined CTS frame format only in response to all sub-channels of a plurality of sub-channels on which the RTS frame was received are idle.

2. The electronic device of claim 1, wherein to determine the CTS frame format, the one or more processors are further configured to:
   determine whether the RTS frame is transmitted only to the electronic device.

3. The electronic device of claim 2, wherein in response to determining that the RTS frame is transmitted only to the electronic device, the CTS frame is configured to include a channel bitmap field indicating at least one sub-channel on which the CTS frame is transmitted.

4. The electronic device of claim 1, wherein to determine the CTS frame format, the one or more processors are further configured to:
   process a subfield of the RTS frame, the subfield representing the CTS frame format indicated by the second electronic device.

5. The electronic device of claim 1, wherein to transmit the CTS frame, the one or more processors are further configured to:
   transmit, using the transceiver, the CTS frame on the plurality of sub-channels on which the RTS frame was received, based at least on determining: that the sub-channels are idle and that the plurality of sub-channels yield a large-size resource unit (RU) aggregation mode.

6. The electronic device of claim 1, wherein the one or more processors are further configured to determine that at least one sub-channel is idle using a high efficiency (HE) clear channel assessment (CCA) mechanism.

7. The electronic device of claim 6, wherein the HE CCA mechanism comprises at least one of a virtual carrier sense (CS) mechanism or an energy detection mechanism during a time period after receiving the RTS frame.

8. The electronic device of claim 1, wherein the one or more processors are configured to transmit the CTS frame on the plurality of sub-channels on which the RTS frame was received and that are idle and wherein the CTS frame is not transmitted on a puncture sub-channel.

9. The electronic device of claim 1, wherein the RTS frame comprises a high efficiency (HE) multi-user (MU) RTS frame.

10. A method, comprising:
    receiving, at a first electronic device, a request to send (RTS) frame sent by a second electronic device;

determining, based at least on the received RTS frame, a clear to send (CTS) frame format to transmit in response to the RTS frame; and transmitting, to the second electronic device, a CTS frame based at least on the determined CTS frame format only in response to all sub-channels of a plurality of sub-channels on which the RTS frame was received are idle.

11. The method of claim 10, wherein determining the CTS frame format further comprises determining whether the RTS frame is transmitted only to the first electronic device.

12. The method of claim 11, wherein in response to determining that the RTS frame is transmitted only to the first electronic device, the CTS frame is configured to include a channel bitmap field indicating at least one sub-channel on which the CTS frame is transmitted.

13. The method of claim 10, wherein determining the CTS frame format further comprises processing a subfield of the RTS frame, the subfield representing the CTS frame format indicated by the second electronic device.

14. The method of claim 10, further comprising determining that the plurality of sub-channels are idle comprises using a high efficiency (HE) clear channel assessment (CCA) mechanism, wherein the HE CCA mechanism comprises at least one of a virtual carrier sense (CS) mechanism or an energy detection mechanism during a time period after receiving the RTS frame.

15. An electronic device, comprising:
a transceiver configured to communicate with a second electronic device; and
one or more processors communicatively coupled to the transceiver and configured to:
generate a request to send (RTS) frame, wherein the RTS frame comprises a first subfield and a second subfield for indicating a bandwidth (BW) associated with the RTS frame;
determine that a plurality of sub-channels are idle;
transmit, using the transceiver and to the second electronic device, the RTS frame on the plurality of sub-channels; and
receive, using the transceiver and from the second electronic device, a clear to send (CTS) frame only in response to all sub-channels of the plurality of sub-channels on which the RTS frame was transmitted are idle.

16. The electronic device of claim 15, wherein the RTS frame further comprises a common info field, wherein the first subfield is in the common info field and the second subfield is in a special user info field.

17. The electronic device of claim 15, wherein to transmit the RTS frame, the one or more processors are further configured to:
transmit the RTS frame on the plurality of sub-channels when the plurality of sub-channels are idle and the plurality of sub-channels yield a large-size resource unit (RU) aggregation mode where 242 or more RUs are aggregated in the RTS frame.

18. The electronic device of claim 15, wherein the RTS frame comprises a high efficiency (HE) multi-user (MU) RTS frame.

19. The electronic device of claim 15, wherein the BW associated with the RTS frame comprises one of 320 MHz, 160+160 MHZ, 240 MHz, or 160+80 MHz.

20. The electronic device of claim 19, wherein the RTS frame comprises a special user info field including an association identifier (AID) having a predefined value.

* * * * *

UNITED STATES PATENT AND TRADEMARK OFFICE
CERTIFICATE OF CORRECTION

PATENT NO. : 12,108,447 B2
APPLICATION NO. : 17/187198
DATED : October 1, 2024
INVENTOR(S) : Yong et al.

Page 1 of 1

It is certified that error appears in the above-identified patent and that said Letters Patent is hereby corrected as shown below:

In the Claims

In Column 26, Claim 19, Line 29, delete "MHZ," and insert -- MHz, --, therefor.

Signed and Sealed this
Thirteenth Day of May, 2025

Coke Morgan Stewart
*Acting Director of the United States Patent and Trademark Office*